United States Patent
Kai et al.

(10) Patent No.: US 7,442,127 B2
(45) Date of Patent: Oct. 28, 2008

(54) PROPELLER SHAFT AND ROTATIONAL POWER TRANSMISSION MECHANISM EQUIPPED WITH THIS

(75) Inventors: Shunnosuke Kai, Wako (JP); Shinji Wada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 11/205,300

(22) Filed: Aug. 16, 2005

(65) Prior Publication Data

US 2006/0040753 A1 Feb. 23, 2006

(30) Foreign Application Priority Data

Aug. 20, 2004 (JP) .............................. 2004-240256

(51) Int. Cl.
*F16C 3/00* (2006.01)
(52) U.S. Cl. ........................ 464/181; 464/182; 464/183
(58) Field of Classification Search ......... 464/179–183, 464/170–173; 440/83
See application file for complete search history.

(56) References Cited

U.S. PATENT DOCUMENTS

| | | | | |
|---|---|---|---|---|
| 3,111,825 A | * | 11/1963 | Stillwagon, Jr. ............. | 464/173 |
| 4,568,313 A | * | 2/1986 | Diffenderfer et al. ....... | 464/172 |
| 4,696,660 A | * | 9/1987 | Murphy et al. .............. | 464/170 |
| 5,836,825 A | * | 11/1998 | Yamane ....................... | 464/181 |
| 6,190,263 B1 | * | 2/2001 | Kimoto et al. .............. | 464/181 |
| 6,692,366 B1 | * | 2/2004 | Savant ........................ | 464/170 |

FOREIGN PATENT DOCUMENTS

| | | |
|---|---|---|
| JP | 7091431 | 4/1995 |
| JP | 7008632 | 7/1995 |
| JP | 09068214 | 3/1997 |
| JP | 09175202 | 7/1997 |
| JP | 10194004 | 7/1998 |
| JP | 11078563 | 3/1999 |

* cited by examiner

*Primary Examiner*—Victor MacArthur
(74) *Attorney, Agent, or Firm*—Carrier, Blackman & Associates, P.C.; Joseph P. Carrier; William D. Blackman

(57) ABSTRACT

A propeller shaft PS1 comprises a front pipe member 10 and first and second yoke members 20 and 30, which are attached to both the ends of the front pipe member 10. The first yoke member 20 is attached by press-fitting a first yoke fitting portion 23 into the inner circumferential part at the left end of the front pipe member 10 until the front end of the front pipe member comes near a stopper portion 24. The second yoke member 30, which has no stopper portion, is attached by press-fitting a second yoke fitting portion 33 into the inner circumferential part at the right end of the front pipe member 10. When a compressive force greater than a predetermined force acts axially, while the first yoke fitting portion 23 is prevented from being further inserted by the stopper portion 24, the second yoke fitting portion 33 is press-fit further into the inner circumferential part of the front pipe member, which is thereby expanded and destroyed.

6 Claims, 5 Drawing Sheets

PROPELLER SHAFT AND ROTATIONAL POWER TRANSMISSION MECHANISM EQUIPPED WITH THIS

FIELD OF THE INVENTION

The present invention relates to a propeller shaft which comprises a first yoke member and a second yoke member each attached at a respective end of a hollow pipe member and which is used for transmission of a driving force from the engine to drive wheels, for example, in an automobile. The present invention also relates to a rotational power transmission mechanism equipped with this propeller shaft.

BACKGROUND OF THE INVENTION

Automobiles of FR drive model or four-wheel drive model generally comprise, as a power transmission transmitting the rotational driving force of the engine to drive wheels, a rotational power transmission mechanism that transmits the rotational driving force from the transmission (rotational drive member), which outputs the power of the engine with speed ratio changes, through a propeller shaft (rotational power transmission member) to an axle device (rotational driven member). For example, the engine is placed in the front part of the vehicle, and the output rotation of the transmission, which is coupled to the engine, is transmitted through the propeller shaft to the rear axle device. Various such power transmissions have been known, and some are disclosed in Japanese Laid-Open Patent Publication No. H10(1998)-194004 and in Japanese Laid-Open Utility-Model Publication No. H07(1995)-8632.

The propeller shaft comprises a hollow pipe member and yoke members, which are attached at the respective ends of the pipe member, each yoke member constituting a universal joint. Through the universal joints, the output shaft of the transmission and the input shaft of the rear axle are connected to the propeller shaft. The hollow pipe member, which has been conventionally made of an iron material, are nowadays made of Fiber Reinforced Plastic (FRP) or Carbon Fiber Reinforced Plastic (CFRP), which is a light weight material that provides sufficient strength. A propeller shaft comprising a hollow pipe member made of such a material as FRP or CFRP is hereinafter referred to as an FRP propeller shaft.

By the way, to increase the safety of an automobile in an event of head-on collision, the vehicle has a structure that allows the front part of the engine room to collapse for absorbing the impact energy at the time of head-on collision (this structure is a so-called crushable construction). Accordingly, the engine in the engine room and the transmission, which is coupled to the engine as a one-piece body, are designed to recede at the time of head-on collision. In this case, if the vehicle comprises a rotational power transmission mechanism, which transmits the rotational driving force from the transmission through the propeller shaft to the rear axle device as mentioned above, then the propeller shaft may interfere with the recession of the engine and the transmission. Especially, if the propeller shaft is an FRP propeller shaft, which has a high rigidity against a compressive force in its axial direction and therefore shows a property of low impact energy absorption, then the FRP propeller shaft can obstruct an appropriate recessive movement of the engine, etc., which will result in a low performance of impact energy absorption. Therefore, for example, Japanese Laid-Open Patent Publication No. H 11(1999)-78563, Patent publication No. 3063583, Japanese Laid-Open Patent Publication No. H7(1995)-91431 and Japanese Laid-Open Patent Publication No. H9(1997)-175202 disclose device arrangements for improving the impact energy absorption property, in which arrangements the FRP shaft deforms and breaks up when it receives a comparatively small axial compressive force.

PROBLEMS TO BE SOLVED BY THE INVENTION

Japanese Laid-Open Patent Publication No. H11(1999)-78563 discloses a construction in which a metal shaft is spline-fitted in a hollow cylinder. However, this construction is structurally complicated. Also, Patent publication No. 3063583, Japanese Laid-Open Patent Publication No. H7(1995)-91431 and Japanese Laid-Open Patent Publication No. H9(1997)-175202 disclose a propeller shaft that comprises a hollow pipe member made of FRP with fragile parts attached to its ends to achieve an improved impact energy absorption property. In this case, when the propeller shaft receives an axial compressive force at the time of head-on collision, the fragile parts collapse to absorb the impact energy. However, it is difficult not only to predict which end of the pipe member actually collapses at the collision but also to prevent the collapsed propeller shaft from whirling.

Furthermore, for example, Patent publication No. 3063583 discloses a pipe member for the propeller shaft. In this case, both the ends of the pipe member are designed with an enlarged internal diameter to provide fragile parts, and the pipe member of the FRP propeller shaft is formed by winding resin-impregnated carbon fibers around a tubular mandrel. In the production process, it is necessary to use a mandrel whose two ends have a diameter that is larger than that of the central part thereof. However, the mandrel in this design cannot be removed as it is after the pipe member has been formed by winding fibers. Therefore, the mandrel comprises two pieces, which are combined with screws at the center of the mandrel but are separated from each other for removal by releasing the screws. This arrangement complicates the production of the pipe member and thereby increases the production cost.

SUMMARY OF THE INVENTION

To solve the above mentioned problem, it is an object of the present invention to provide a propeller shaft whose specific part collapses by an axial compressive force generated from a collision and which propeller shaft has a relatively simple construction. It is also an object of the present invention to provide a rotational power transmission mechanism equipped with such a propeller shaft.

Furthermore, it is an object of the present invention to provide a propeller shaft whose construction makes it simple to produce an FRP hollow pipe member, which constitutes an FRP propeller shaft.

To achieve these objectives, a propeller shaft according to the present invention comprises a hollow pipe member (for example, the front propeller shaft PS1 described in the following embodiment) and first and second yoke members (for example, the first and second yokes 20 and 30 described in the following embodiment), which are attached to both the ends of the hollow pipe member, respectively. In the propeller shaft, the first yoke member comprises a cylindrical first yoke fitting portion (for example, the fitting portion 23 described in the following embodiment), which is press-fit into an inner circumferential part of a first fittingly receiving portion (for example, the left short pipe body 16 described in the following embodiment) that is a thickened part at one end of the hollow pipe member. The first yoke member also comprises a stopper portion (for example, the stopper portion 24 described in the following embodiment), which is provided protruding radially at a position axially outside the first yoke fitting portion. The first yoke fitting portion is press-fit into the inner circumferential part of the first fittingly receiving portion until one end of the hollow pipe member comes close to the stopper portion, so that the first yoke member is attached to the one end of the hollow pipe member. On the other hand, the second yoke member (for example, the second yoke 30 described in the following embodiment) comprises a cylindrical second yoke fitting portion (for example, the fitting portion 33 described in the following embodiment), which is press-fit into an inner circumferential part of a second fittingly receiving portion (for example, the right short pipe body 17 described in the following embodiment) that is a thickened part at the other end of the hollow pipe member. The second yoke fitting portion is press-fit into the inner circumferential part of the second fittingly receiving portion, so that the second yoke member is attached to the other end of the hollow pipe member. When a compressive force greater than a predetermined force acts axially on the propeller shaft, while further press-fitting insertion of the first yoke fitting portion is blocked by the stopper portion, which hits the one end of the hollow pipe member, the second yoke fitting portion is press-fit beyond the second fittingly receiving portion further into an inner circumferential part of the hollow pipe member, with the second fittingly receiving portion being expanded and destroyed at its axially inward part.

It is preferable that, in the above described propeller shaft, the central portion of the hollow pipe member and the first fittingly receiving portion have an identical internal diameter, which is smaller than the internal diameter of the second fittingly receiving portion. It is also preferable that the hollow pipe member be made of an FRP or CFRP material.

A rotational power transmission mechanism according to the present invention comprises the above described propeller shaft, through which a rotational driving force from a rotational drive member is transmitted to a rotational driven member, and a protective member (for example, the protective cover 5 described in the following embodiment), which is provided to enclose the second fittingly receiving portion.

The propeller shaft according to the present invention provides an improved property of impact energy absorption because when a compressive force greater than a predetermined force acts axially on the propeller shaft, for example, in a head-on collision, while further press-fitting insertion of the first yoke fitting portion is blocked by the stopper portion, which hits the one end of the hollow pipe member, the second yoke fitting portion is press-fit beyond the second fittingly receiving portion further into the inner circumferential part of the hollow pipe member, with the second fittingly receiving portion being expanded and destroyed at its axially inward part. Since this damage is limited to the section at the root of the second yoke fitting portion, it is easy to adopt a measure to prevent further damage.

In the rotational power transmission mechanism according to the present invention, as the protective member encloses the second fittingly receiving portion, where damage to the pipe member actually occurs, the protective member prevents the damaged part of the pipe member from swirling when the pipe member is damaged at the root of the second fittingly receiving portion by a compressive force, for example, in a head-on collision. As a result, parts that are located near the second fittingly receiving portion are effectively protected against damage that may otherwise occur from a swirling of the pipe member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DETAILED DESCRIPTION OF THE PREFERRED EMBODIMENTS

Now, the power transmission of an automobile with a propeller shaft according to the present invention is described in reference to the drawings.

Figure 1:
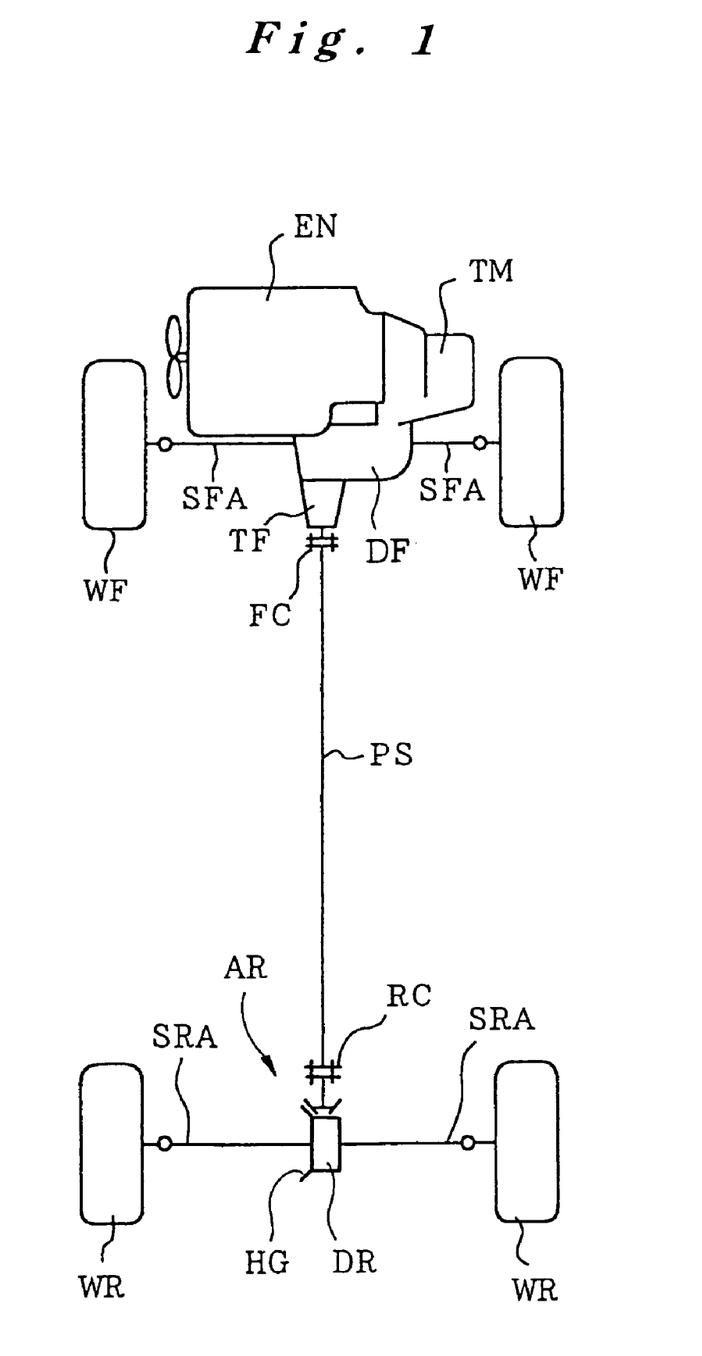
FIG. 1 is a schematic diagram describing the power transmission system of a four-wheel drive vehicle, which has a propeller shaft according to the present invention.

The automobile shown in FIG. 1 is a four-wheel drive vehicle and comprises an engine EN, which is oriented laterally at the front part of the vehicle, and a transmission TM, which is coupled to the output side of the engine EN as a unit. The transmission TM includes a front differential mechanism DF and a transfer mechanism TF. The power of the engine EN with a speed ratio change by the transmission TM is transmitted through the front differential mechanism DF and divided to right and left front axle shafts SFA for driving the right and left front wheels WF. The power of the engine EN is also divided through the transfer mechanism TF, and the power is transmitted from a front coupling FC to a front propeller shaft PS1. As also shown in FIG. 2, the front propeller shaft PS1 is coupled through a center coupling CC with a rear propeller shaft PS2 in series, and the rear propeller shaft PS2 is connected through a rear coupling RC to a rear axle device AR.

The rear axle device AR comprises a hypoid gear mechanism HG (final reduction mechanism) and a rear differential mechanism DR. The hypoid gear mechanism HG changes the rotational direction and reduces the rotational speed transmitted from the rear propeller shaft PS2 for rotational transmission to rear axle shafts SRA, which are disposed orthogonal to the rear propeller shaft PS2. The rear differential mechanism DR is positioned on the right side of the hypoid gear mechanism HG and transmits the rotational power from the hypoid gear mechanism HG to the right and left rear axle shafts SRA. In the rear axle device AR, while the power of the engine is being transmitted through the propeller shafts PS1 and PS2, the rotational direction is changed as well as the rotational speed is reduced by the hypoid gear mechanism HG, and the division and transmission of the power to the right and left rear axle shafts SRA are controlled for driving the right and left rear wheels WR by the rear differential mechanism DR.

Figure 2:
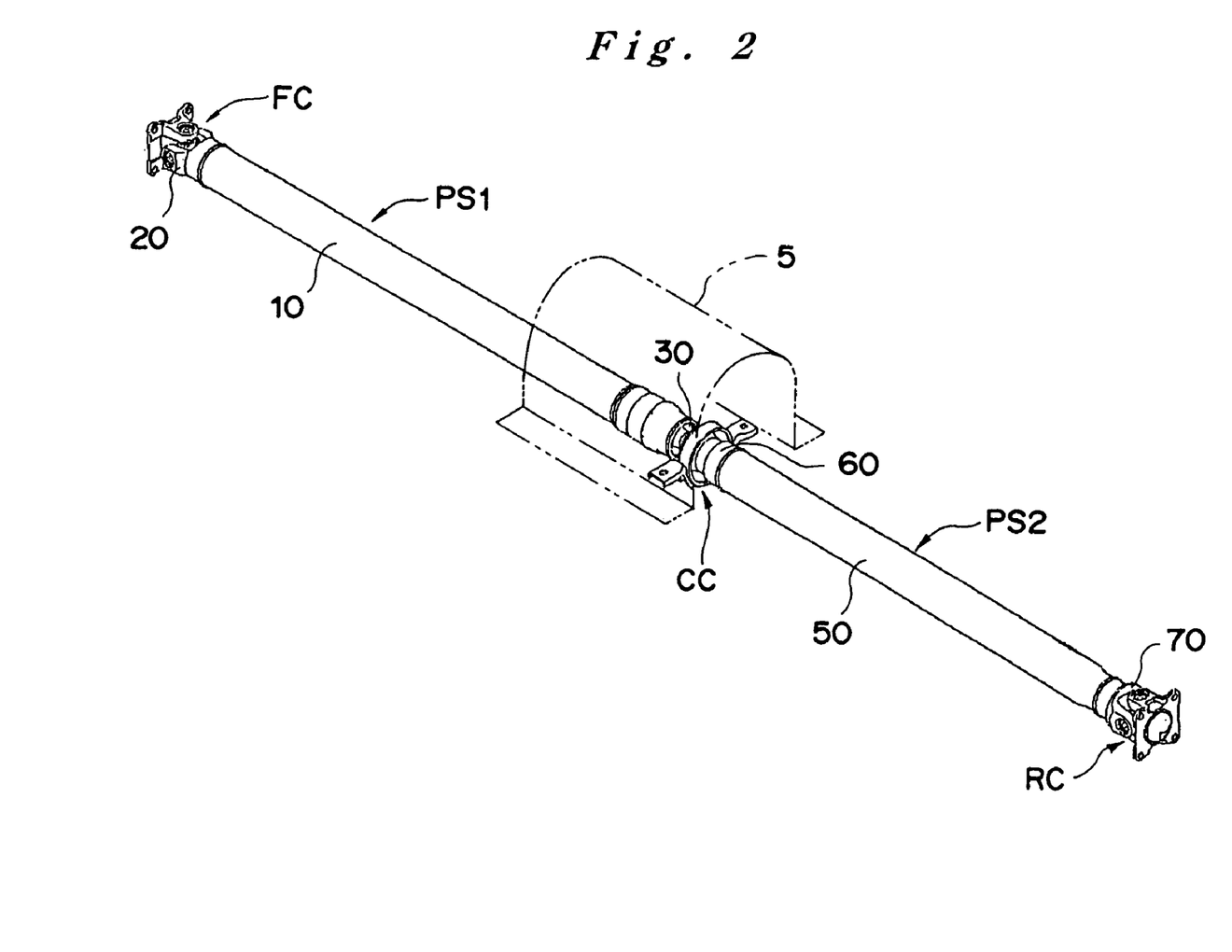
FIG. 2 is a perspective view showing front and rear propeller shafts, which constitutes the power transmission system.
Figure 3:
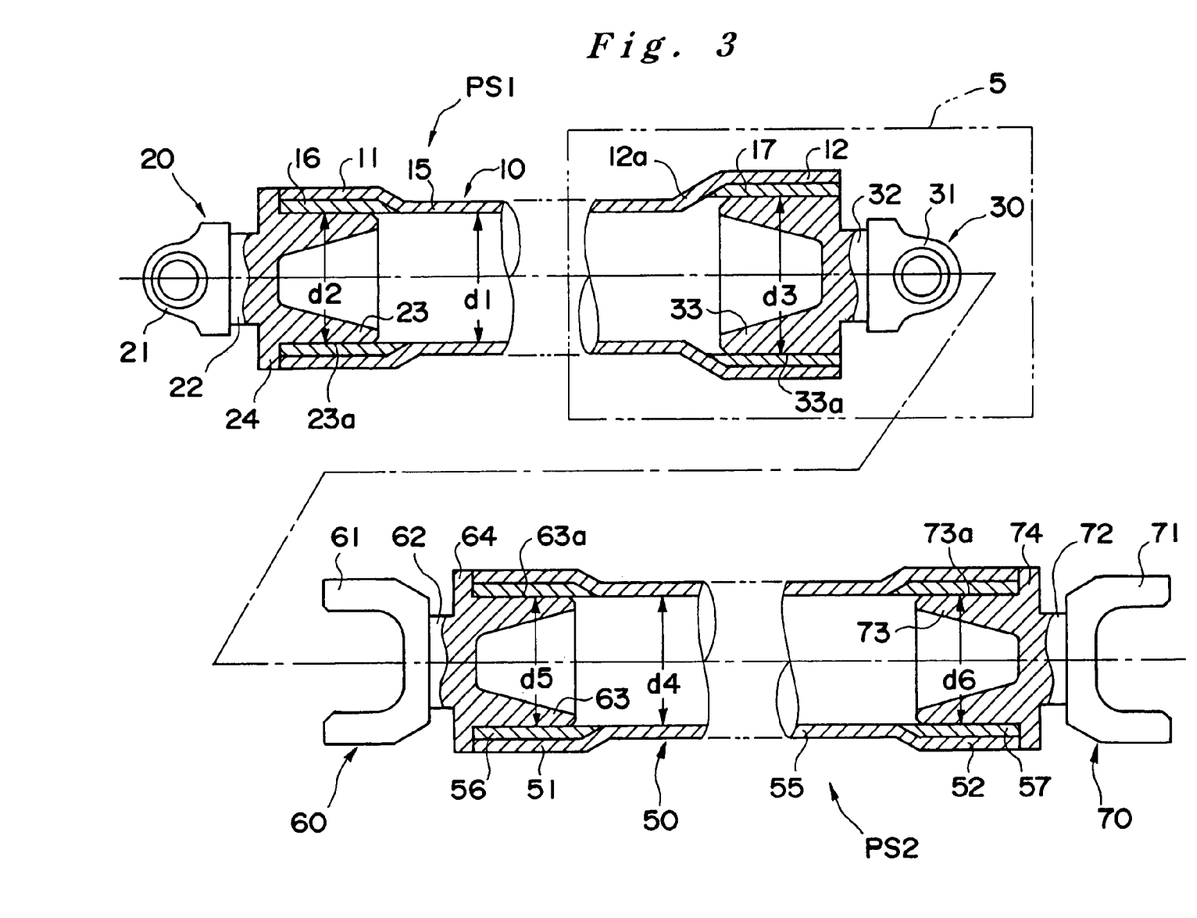
FIG. 3 is a sectional view showing the construction of the front and rear propeller shafts.
Figure 4:
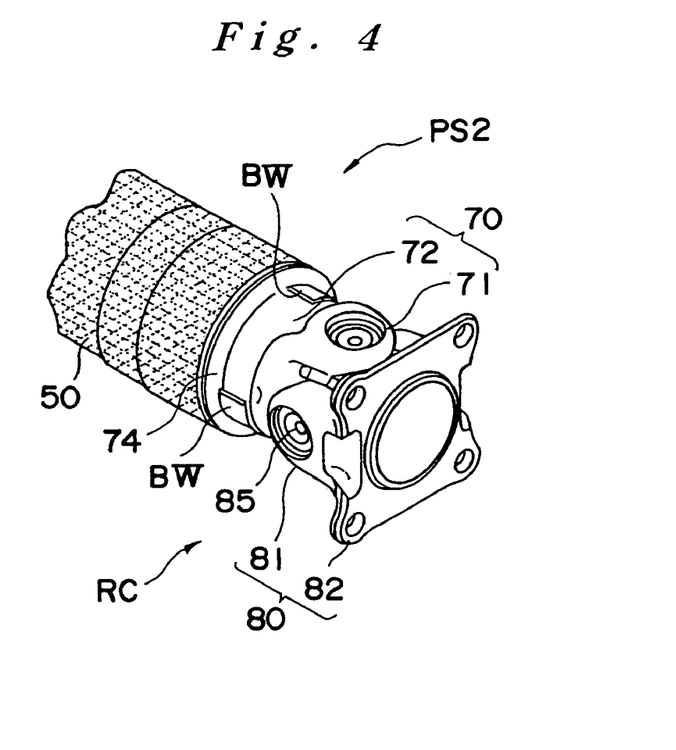
FIG. 4 is a perspective view showing the rear end of the rear propeller shaft.

In this power transmission system, though the present invention is applied only to the propeller shaft PS1, the construction of the front and rear propeller shafts PS1 and PS2 is explained in reference to FIGS. 2, 3 and 4.

The front propeller shaft PS1 comprises a front pipe member 10, which is formed of CFRP in a hollow cylinder, a first yoke 20, which is connected to the front end of the front pipe member 10 and constitutes the above mentioned front coupling FC, and a second yoke 30, which is connected to the rear end of the front pipe member 10 and constitutes part of the center coupling CC. The rear propeller shaft PS2 comprises a rear pipe member 50, which is formed of CFRP in a hollow cylinder, a third yoke 60, which is connected to the front end of the rear pipe member 50 and constitutes another part of the center coupling CC, and a fourth yoke 70, which is connected to the rear end of the rear pipe member 50 and constitutes part of the rear coupling RC.

Since the front coupling FC, the center coupling CC and the rear coupling RC have similar constructions, only the construction of the rear coupling RC is explained below as a representative in reference to FIGS. 3-4. The rear coupling RC comprises the above mentioned fourth yoke 70 and a flange yoke 80, which is connected to the fourth yoke 70 through cross pins 85. The fourth yoke 70 is a stub yoke made of a metal material, and it is press-fit in the inner circular part of the pipe member 50 at the rear end thereof, which constitutes the rear propeller shaft PS2.

The fourth yoke 70 comprises a yoke portion 71, a neck portion 72, a fitting portion 73 and a stopper portion 74 in a one-piece body. The yoke portion 71 is a Y-shaped portion at the rear end of the fourth yoke 70. The fitting portion 73 is positioned on the front side, and it is provided with spline teeth around the cylindrical outer periphery thereof. The neck portion 72 is also cylindrical with a smaller diameter and connects the yoke portion 71 and the fitting portion 73. The stopper portion 74 projects radially in a ring form at the rear end of the fitting portion 73. On the outer periphery of the neck portion 72, balance-weight plates BW are attached as necessary in adjustment for rotational balance. A pair of arm portions of the cross pins 85 are connected pivotally to the yoke portion 71 while the other pair of arm portions of the cross pins 85 are connected pivotally to the yoke portion 81, constituting a so-called universal joint. The fitting portion 73 is press-fit in the inner circular part of the rear pipe member 50, so the spline teeth formed on the outer periphery 73a of the fitting portion 73 bite into the inner circular part of the rear pipe member 50. As a result, the rear pipe member 50 and the fourth yoke 70 are joined to each other firmly. This junction construction is described in detail later.

On the other hand, the flange yoke 80 comprises a yoke portion 81, to which the cross pins are connected pivotally, and a rectangular flange portion 82, which is connected to the yoke portion 81 as a one-piece body. The flange portion 82 is connected also to the input shaft of the hypoid gear mechanism HG.

Now, the construction of the front propeller shaft PS1 is described in detail in reference to FIG. 3. Since the construction of the front and center couplings FC and CC resembles that of the above described rear coupling RC, resembling parts are explained briefly.

The front pipe member 10 is formed in a hollow cylinder by winding carbon fibers in bundles, which fibers are impregnated with a resin, as described later. The central portion 15 of the front pipe member 10 is formed in a hollow cylinder with an internal diameter d1, and the right and left end portions 11 and 12 of the front pipe member 10 are expanded radially, respectively, with the internal diameter of the right end portion 12 being larger than that of the left end portion 11. In the right and left end portions 11 and 12, FRP short pipe bodies 16 and 17, each of which is formed in a hollow cylinder by winding resin-impregnated carbon fibers in bundles, are fitted, respectively, so that the FRP short pipe bodies 16 and 17 are attached to the front pipe member 10 as a one-piece body.

The first, or left short pipe body 16 provides a first fittingly receiving portion for receiving a fitting portion 23 of a first yoke member, as will be further described herein. Similarly, the second, or right short pipe body 17 provides a second fittingly receiving portion for receiving a fitting portion 24 of a second yoke member, as will be further described herein. The short pipe bodies 16 and 17 have the same thickness but different diameters, because the right end portion 12 has a larger diameter than the left end portion 11. Therefore, the internal diameter $d3$ of the right short pipe body 17 is larger than the internal diameter $d2$ of the left short pipe body 16, which is set equal to the internal diameter $d1$ of the central portion 15. As a result, there is the following relation: $d1=d2$, and $d1<d3$. Accordingly, a conical portion 12a exists at the segment extending between the right end portion 12 and the central portion 15.

It is clear from this arrangement that the right and left end portions of the front pipe member 10 are thicker than the other part because of the right and left short pipe bodies 16 and 17, which are fitted in the front pipe member 10 as a one-piece body. At the thickened right and left end portions, the fitting portion 23 of the first yoke 20 and the fitting portion 33 of the second yoke 30 are press-fitted in the right and left short pipe bodies 16 and 17, respectively.

The first yoke 20 comprises, in a one-piece body, a Y-shaped yoke portion 21, a cylindrical neck portion 22, the above mentioned fitting portion 23, which is provided with spline teeth 23a on the outer periphery thereof, and a ring-like stopper portion 24, which is positioned in front of the fitting portion 23, protruding radially. As mentioned above, the fitting portion 23 is press-fit circumferentially into the left short pipe body 16, with the left end face of the front pipe member 10 substantially meeting the stopper portion 24 of the first yoke 20. In this condition, the spline teeth 23a of the outer periphery of the fitting portion 23 of the first yoke 20 bite into the left short pipe body 16, resulting in a firm and secure connection between these components.

The second yoke 30 comprises a Y-shaped yoke portion 31, a cylindrical neck portion 32, and the above mentioned fitting portion 33, which is provided with spline teeth 33a on the outer periphery thereof, in a one-piece body. As mentioned above, the fitting portion 33, whose outer diameter is designed appropriately for press-fitting with respect to the internal diameter $d3$ of the right short pipe body 17, is press-fit circumferentially into the right short pipe body 17 all the way until the whole fitting portion 33 enters the right short pipe body 17 as shown in FIG. 3. In this condition, the spline teeth 33a of the outer periphery of the fitting portion 33 of the second yoke 30 bite into the right short pipe body 17, resulting in a firm and secure connection between these components.

The rear pipe member 50 is formed in a hollow cylinder by winding carbon fibers in bundles, which fibers are impregnated with a resin, as described later. The central portion 55 of the rear pipe member 50 is formed in a hollow cylinder with an internal diameter $d4$, and the right and left end portions 51 and 52 of the rear pipe member 50 are expanded radially, respectively, with the left end portion 51 and the right end portion 52 having a same diameter. In the right and left end portions 51 and 52, FRP short pipe bodies 56 and 57, each of which is formed in a hollow cylinder by winding resin-impregnated carbon fibers in bundles, are fitted, respectively, so that the FRP short pipe bodies 56 and 57 are attached to the rear pipe member 50 as a one-piece body. The short pipe bodies 56 and 57 have a same thickness, and their internal diameters d5 and d6 are set equal to the internal diameter d4 of the central portion 55. As a result, there is the following relation: d4=d5=d6. Like the above mentioned front pipe member 10, the right and left end portions of the rear pipe member 50 are thicker than the other part because of the right and left short pipe bodies 56 and 57, which are fitted in the rear pipe member 50 as a one-piece body. At the thickened right and left end portions, the fitting portion 63 of the third yoke 60 and the fitting portion 73 of the fourth yoke 70 are press-fitted in the right and left short pipe bodies 56 and 57, respectively.

The third yoke 60 comprises, in a one-piece body, a Y-shaped yoke portion 61, a cylindrical neck portion 62, the above mentioned fitting portion 63, which is provided with spline teeth 63a on the outer periphery thereof, and a ring-like stopper portion 64, which is positioned in front of the fitting portion 63, protruding radially. As mentioned above, the fitting portion 63 is press-fit circumferentially into the left short pipe body 56, with the left end face of the rear pipe member 50 substantially meeting the stopper portion 64 of the third yoke 60. In this condition, the spline teeth 63a of the outer periphery of the fitting portion 63 of the third yoke 60 bite into the left short pipe body 56, resulting in a firm and secure connection between these components.

The fourth yoke 70 comprises, in a one-piece body, a Y-shaped yoke portion 71, a cylindrical neck portion 72, the above mentioned fitting portion 73, which is provided with spline teeth 73a on the outer periphery thereof, and a ring-like stopper portion 74, which is positioned in back of the fitting portion 73, protruding radially. As mentioned above, the fitting portion 73 is press-fit circumferentially into the right short pipe body 57, with the right end face of the rear pipe member 50 substantially meeting the stopper portion 74 of the fourth yoke 70. In this condition, the spline teeth 73a of the outer periphery of the fitting portion 73 of the third yoke 70 bite into the right short pipe body 57, resulting in a firm and secure connection between these components.

Now, a description is given of the impact energy absorption at the time of head-on collision by the front propeller shaft PS1 and the rear propeller shaft PS2, which are constructed as described above and constitute the power transmission of the automobile shown in FIG. 1. This automobile is also equipped with a so-called crushable construction for safety of passengers, so the engine EN, the transmission TM, which is combined with the engine EN as a unit, and the transfer mechanism TF all recede to absorb the impact energy at the time of head-on collision.

For letting the engine EN and the like recede at the time of head-on collision, the front pipe member 10 is designed to collapse at the rear part of the front propeller shaft PS1 when the front and rear propeller shafts PS1 and PS2 are subjected to an axial compressive force. This collapsing reaction is described in reference to FIG. 5.

Figure 5:
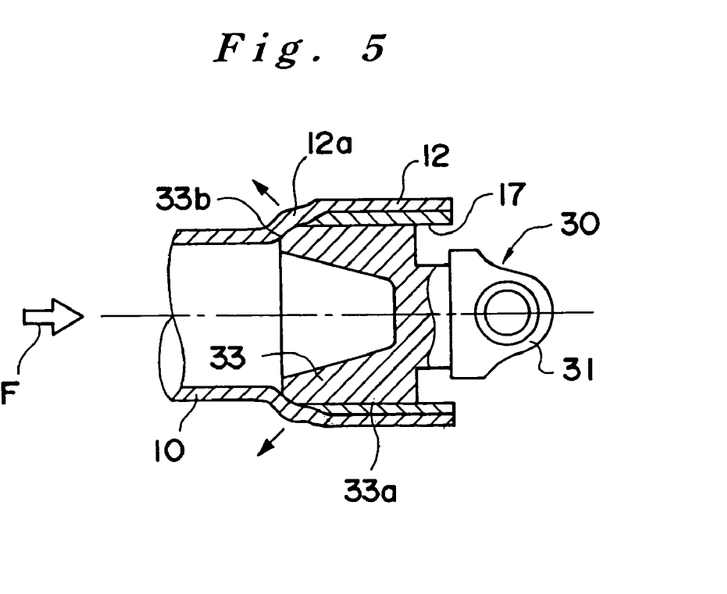
FIG. 5 is a partly sectional side view indicating a reaction of the rear end of the front propeller shaft at the time of collision.

When the engine EN and the like receive a reward impact generated by a collision, and if a relatively large compressive force acts on the front and rear propeller shafts PS1 and PS2 in their axial direction, this compressive force overcomes the bonding power of the press-fitting between the front and rear pipe members 10 and 50 and the fitting portions 23, 33, 63 and 73 of the first, second, third and fourth yokes 20, 30, 60 and 70, because the bonding powers of the press-fitted parts are so designed not to withstand the axial compressive force that is larger than a certain magnitude. In other words, the press-fitting force is set such that the fitting portions are inserted further into the front and rear pipe members 10 and 50 when such a compressive force acts at the time of collision.

However, as described above, as the first, third and fourth yokes 20, 60 and 70 have their respective stopper portions 24, 64 and 74, and the fitting portions 23, 63 and 73 are stopped by the stopper portions, respectively, so they are inserted no further. On the other hand, as the second yoke 30 has no stopper, the fitting portion 33 of the second yoke 30 is pushed further into the right short pipe body 17 by the compressive force F generated in a collision as shown in FIG. 5. As a result, the front peripheral end 33b of the fitting portion 33 hits, pushes and expands the above mentioned conical portion 12a, finally destroying it. Therefore, the front and rear propeller shafts PS1 and PS2 will not block the recession of the engine EN and the like, so the impact energy is effectively absorbed to improve the safety in a collision.

As it is understood from the above description, if the front and rear propeller shafts PS1 and PS2 receive a sufficient compressive force F in a collision, then the front pipe member 10 is destroyed specifically at the press-fit part between the second yoke 30 and the front pipe member 10. To cover this part, a protective cover 5 is provided in the vehicle as shown in FIGS. 2 and 3, so this protective cover prevents the front propeller shaft PS1 from swirling when the front pipe member 10 is broken up at that specific part. In this way, surrounding parts are effectively protected from damage in the event of collision.

In the above embodiment, the breaking point for safety is designed at the press-fit part of the second yoke 30 at the rear end of the front propeller shaft PS1. However, any of the press-fit parts of the first, second, third and fourth yokes may be set as a breaking point for safety. This breaking point should be determined in consideration of surrounding parts that may be damaged by the swirling of the broken propeller shaft, so the position of the breaking point is decided not to damage, for example, brake piping, control cables, a fuel tank, and the like.

Figure 6A:
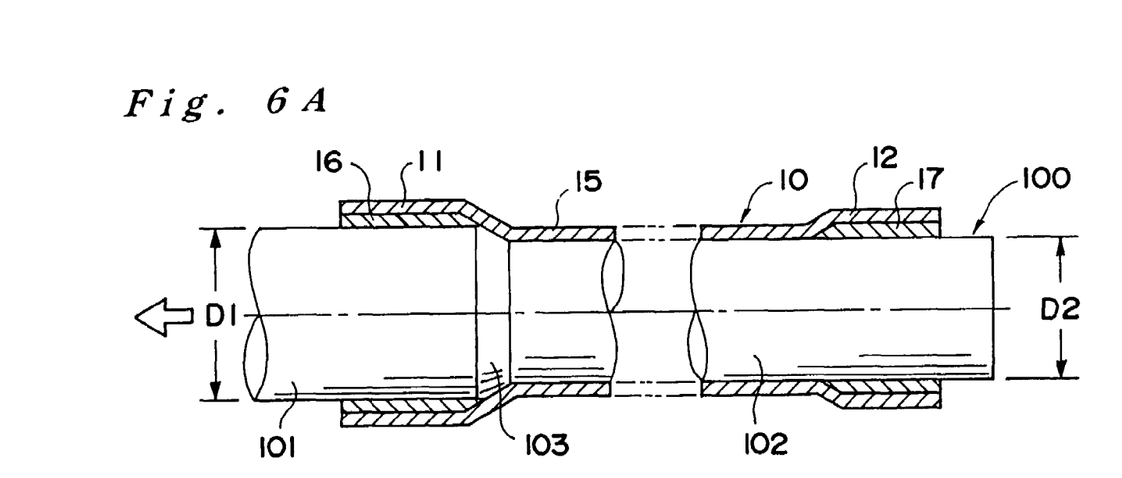
FIG. 6 is a partly sectional side view indicating a method for producing pipe members that constitute the propeller shafts.

Now, a method for producing the front and rear pipe members 10 and 50 is described in reference to FIG. 6. At first, a method for producing the front pipe member 10 is described in reference to FIG. 6A. In this method, resin-impregnated CFRP fibers are wound around a mandrel 100, which comprises a first cylindrical portion 101, a second cylindrical portion 102 and a connecting portion 103 in a one-piece body. The first cylindrical portion 101 has an outer diameter D1 that is equal to the internal diameter d3 of the right short pipe body 17, and the second cylindrical portion 102 has an outer diameter D2 that is equal to the internal diameter d2 of the left short pipe body 16. The connecting portion 103 has a conical figure and connects the first cylindrical portion 101 and the second cylindrical portion 102 in a one-piece body. In this method, firstly, the above mentioned left and right short pipe bodies 16 and 17 are formed at predetermined positions, respectively, on the first cylindrical portion 101 and on the second cylindrical portion 102 by circumferentially winding resin-impregnated CFRP fibers. Secondly, the left and right end portions 11 and 12 and the central portion 15 are formed enclosing the left and right short pipe bodies 16 and 17 by helically winding resin-impregnated CFRP fibers all the way around the mandrel 100. Thirdly, this product is heat-treated, and then the mandrel 100 is pulled away in the direction indicated by an arrow in the drawing, completing the production of the front pipe member 10.

Figure 6B:
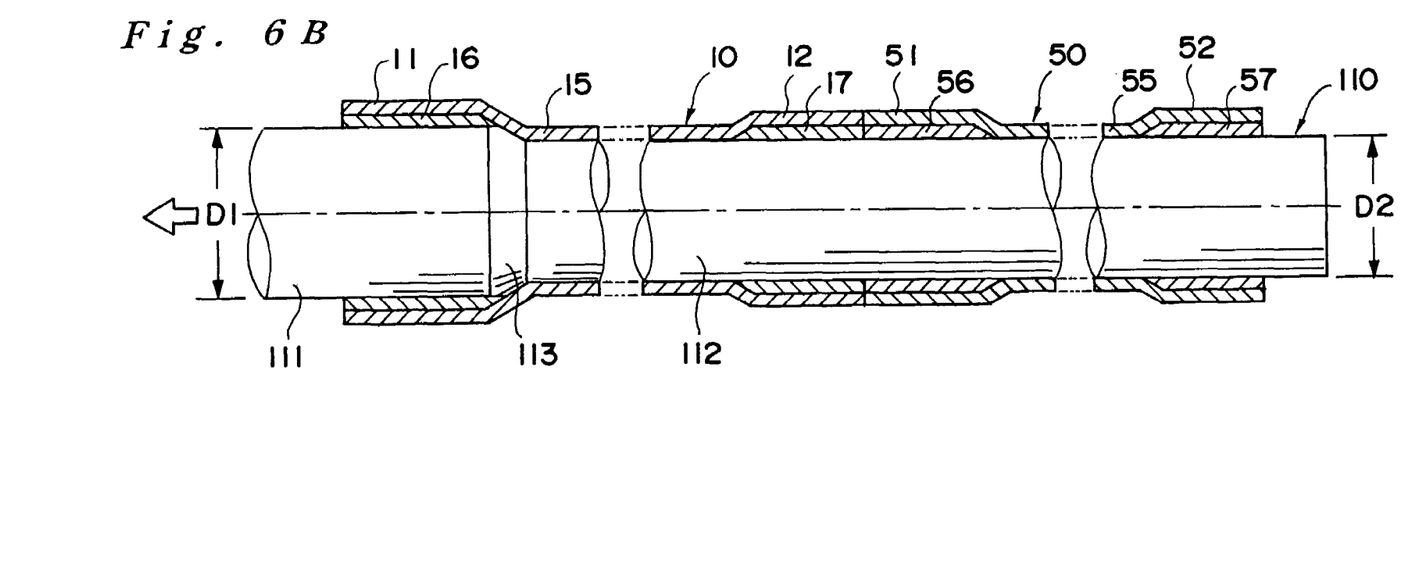

In another method, which is shown in FIG. 6B, the front and rear pipe members 10 and 50 can be produced together.

This method also uses a mandrel 110, which is similar to the mandrel 100. The mandrel 110 also comprises a first cylindrical portion 111, which has the outer diameter D1, a conical connecting portion 113 and a second cylindrical portion 112, which has the outer diameter D2. However, the second cylindrical portion 112 of the mandrel 110 has a longer axial length than the second cylindrical portion 102 of the mandrel 100. In this method, firstly, the above mentioned left and right short pipe bodies 16 and 17 and 56 and 57 are formed at predetermined positions, respectively, on the mandrel 110 by circumferentially winding resin-impregnated CFRP fibers as shown in the drawing. Secondly, the left and right end portions 11 and 12 and the central portion 15 and the left and right end portions 51 and 52 and the central portion 55 are formed enclosing the left and right short pipe bodies 16 and 17 and 56 and 57 by helically winding resin-impregnated CFRP fibers all the way around the mandrel 110. Thirdly, this product is heat-treated, and then the mandrel 110 is pulled away in the direction indicated by an arrow in the drawing, completing the production of the front and rear pipe members 10 and 50.

In the above described methods, the mandrels 100 and 110 are removed, respectively, by pulling them in one direction. This mandrel removal makes it unnecessary to use a prior-art mandrel, which is designed to divide into two pieces, each piece to be pulled in an opposite direction. As a result, the production method according to the present invention is simple and cost effective.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2004-240256 filed on Aug. 20, 2004, which is incorporated herein by reference.

What is claimed is:

1. A propeller shaft comprising a hollow pipe member, a first yoke member and a second yoke member, said hollow pipe member having a first end, a second end opposite the first end, and a central portion disposed between said ends, wherein the first and second ends have first and second fittingly receiving portions formed therein, respectively, wherein each of the first fittingly receiving portion and the central portion of said hollow pipe member has a substantially identical internal diameter, which is smaller than an internal diameter of said second fittingly receiving portion;

wherein the first and second yoke members are attached to the ends of said hollow pipe member, respectively;

wherein:

said first yoke member comprises:

a cylindrical first yoke fitting portion having a first diameter, which is press-fit into an inner circumferential part of the first fittingly receiving portion at said first end of said hollow pipe member, and a stopper flange portion, which is provided protruding radially outwardly at a position axially outside said first yoke fitting portion;

said first yoke fitting portion is press-fit into said inner circumferential part of said first fittingly receiving portion until said one end of said hollow pipe member comes close to said stopper flange portion, so that said first yoke member is attached to said one end of said hollow pipe member;

said second yoke member comprises a cylindrical second yoke fitting portion having a second diameter which is greater than said first diameter, which is press-fit into an inner circumferential part of the second fittingly receiving portion that is a widened part at the second end of said hollow pipe member;

said second yoke fitting portion is press-fit into said inner circumferential part of said second fittingly receiving portion, so that said second yoke member is attached to said second end of said hollow pipe member; and wherein said propeller shaft is configured such that when a compressive force greater than a predetermined force acts axially on said propeller shaft during use, further press-fitting insertion of said first yoke fitting portion is blocked by said stopper flange portion, which hits said first end of said hollow pipe member, and said second yoke fitting portion is press-fit further into an inner circumferential part of said hollow pipe member beyond said second fittingly receiving portion, with said inner circumferential part of said hollow pipe member beyond said second fittingly receiving portion being expanded and destroyed at an axially inward part thereof.

2. The propeller shaft as set forth in claim 1, wherein:

said first yoke fitting portion is provided with spline teeth around a cylindrical outer periphery thereof;

when said first yoke fitting portion is press-fit into said inner circumferential part of said first fittingly receiving portion, said spline teeth bite into said first fittingly receiving portion, so that said first yoke member is attached to said one end of said hollow pipe member;

said second yoke fitting portion is provided with spline teeth around a cylindrical outer periphery thereof; and when said second yoke fitting portion is press-fit into said inner circumferential part of said second fittingly receiving portion, said spline teeth bite into said second fittingly receiving portion, so that said second yoke member is attached to said other end of said hollow pipe member.

3. The propeller shaft as set forth in claim 1, wherein:

said hollow pipe member is formed as a hollow cylinder of wound bundles of resin-impregnated carbon fibers, with said central portion being a hollow cylinder having an internal diameter and both end portions of said hollow pipe member being expanded radially and having internal diameters larger than the internal diameter of the central portion, the internal diameter of one said end portion being larger than that of the other end portion;

said first and second fittingly receiving portions respectively include pipe bodies, each of which is formed as a hollow cylinder of wound bundles of resin-impregnated carbon fibers, and fitted, respectively, in inner circumferential parts of said end portions of the hollow pipe member so that said pipe bodies are attached to said hollow pipe member as a one-piece body; and an internal diameter of said pipe body of said second fittingly receiving portion is larger than an internal diameter of said pipe body of said first fittingly receiving portion, and said internal diameter of said pipe body of said first fittingly receiving portion is equal to the internal diameter of said central portion.

4. The propeller shaft as set forth in claim 3, wherein:

the conical connecting portion is provided at a part which connects said central portion to said pipe body of said second fittingly receiving portion; and when the compressive force greater than the predetermined force acts axially on said propeller shaft, said second yoke fitting portion is press-fit beyond said second fittingly receiving portion further into said inner circumferential part of said hollow pipe member, with said conical connecting portion being expanded and destroyed by a front end of said second yoke fitting portion.

5. The propeller shaft as set forth in claim 1, wherein:
said hollow pipe member is made of a fiber reinforced plastic or carbon fiber reinforced plastic material.

6. propeller shaft as set forth in claim 1, further comprising a protective member enclosing said second fittingly receiving portion.

* * * * *